Feb. 17, 1925.  1,526,824
E. A. BOCK
HYPODERMIC NEEDLE
Filed Dec. 3, 1923
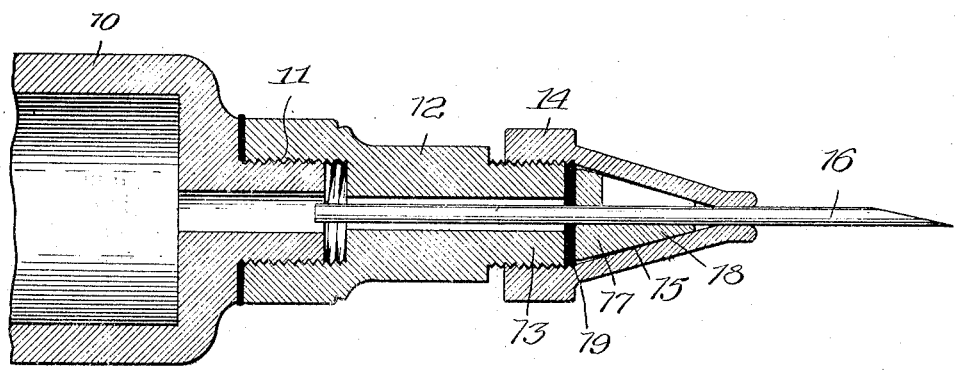
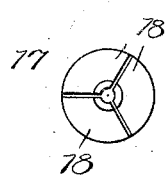
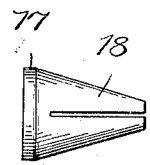
Inventor:
Edmund A. Bock
By Dyrenforth, Lee, Chritton and Wiles,
Attys Patented Feb. 17, 1925.

1,526,824

UNITED STATES PATENT OFFICE.

EDMUND A. BOCK, OF HAMMOND, INDIANA.

HYPODERMIC NEEDLE.

Application filed December 3, 1923. Serial No. 678,220.

*To all whom it may concern:*

Be it known that I, EDMUND A. BOCK, a citizen of the United States, residing at Hammond, in the county of Lake and State of Indiana, have invented a new and useful Improvement in Hypodermic Needles, of which the following is a specification.

This invention relates to hypodermic needles and the like and is fully described in the following specification and shown in the accompanying drawings in which:

Figure 1 is a longitudinal sectional view of a hypodermic syringe embodying the invention;

Fig. 2 is a side elevation of a conical clamping member, and

Fig. 3 is an end elevation of the same.

The embodiment illustrated comprises a syringe 10 having a threaded end 11 on which is screwed an extension 12 having a longitudinal opening therein in alignment with the opening of the end 11.

The outer end of the extension 11 has a threaded end 13 over which is screwed a nut 14 which has a hollow tapered chamber 15.

A straight hollow needle 16 passes through the nut 14 and into the hollow extension 12 and if desired may extend back into the opening in the end 11. This needle may be adjustably moved in and out and is held in adjusted position by means of a conical clamping member 17 which is adapted to fit within the conical chamber 15, so that as the nut 14 is screwed down the clamping member 17 will be forced into this chamber thereby causing the split jaws 18 to be forced inwardly to clamp and hold the needle 16 in any desired position.

A gasket 19 of rubber or the like is preferably placed between the clamping member 17 and the end of the extension 13 so that when the nut is tightened the gasket will prevent leakage both around the needle and around the clamping member 17.

If desired, especially for short needles, the extension 12 may be omitted and the nut 14 screwed directly on the threaded end of the syringe barrel.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

I claim:

1. A needle fastening attachment for a hypodermic syringe including in combination, a hollow member for attachment to the syringe, a nut adapted to be screwed on said member having a conical opening spaced from the inner end of the nut, a conical clamping means separate from said member and nut and disposed in said opening, a hollow needle passing through said nut and clamping means and into the bore of the hollow member, said nut being adapted when screwed down to cause said clamping member to abut the outer end of said hollow member within said opening and to grip said needle.

2. As an article of manufacture, a hollow member adapted for attachment to a hypodermic syringe at its outlet and to receive a hypodermic needle of the ordinary form into its bore, a conical clamping means separate from and abutting the outer end of said member and through which said needle extends, a nut attachable to said member and through which the needle passes, said nut having a conical opening to engage and cause compression of said clamping means to retain the needle.

In witness whereof I have hereunto set my hand and seal this 27th day of November 1923.

EDMUND A. BOCK.